June 14, 1938.    S. STILLSCHWEIG    2,120,924
SEPARABLE FASTENER
Filed Sept. 19, 1935
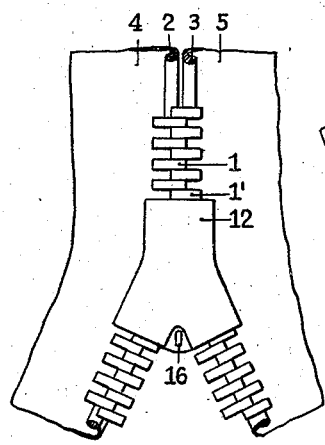
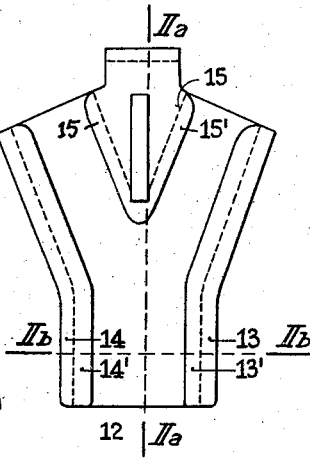
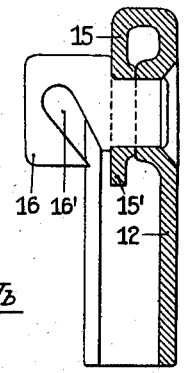
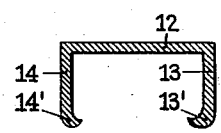
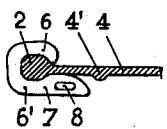
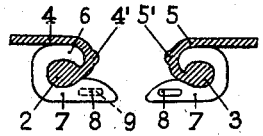
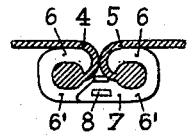
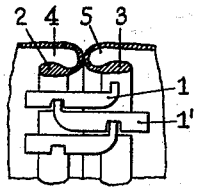
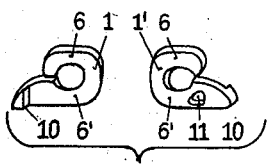
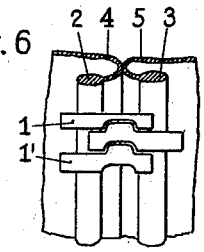
INVENTOR
Sigismund Stillschweig
By B. Linger, atty.

Patented June 14, 1938

2,120,924

UNITED STATES PATENT OFFICE 2,120,924

SEPARABLE FASTENER

Sigismund Stillschweig, Berlin, Germany

Application September 19, 1935, Serial No. 41,299
In Germany October 11, 1934

4 Claims. (Cl. 24—205)

The present invention relates to separable fasteners and more particularly to that type of fasteners for garments, underwear and other purposes wherein two pliable stringers carrying fastener members are locked and unlocked by movement of a sliding member.

In known fasteners of the described type the locking elements proper of the fastener members project beyond the edges of the stringers to which they are attached, so that between the edges an intermediate space is formed, which is only in part covered by the interlocking parts of the fastener members and the width of which can not be reduced below a definite limit, even if the fastener members used are of the smallest possible dimensions. This involves various drawbacks when the fasteners are used in garments, bags and the like, and particularly when they are used in connection with pieces of underwear carried directly on the body, since in this case the parts of the fastener members covering the space between the edges of the stringers will contact with the skin. When fasteners of the known kind are used for other purposes, for instance in connection with ladies' hand bags, the stringers of fabric or other materials are also frequently felt as an annoyance, and this has without doubt limited the use of separable fasteners of the described kind for various purposes.

According to the present invention the fastener members are so formed, that, in contrast to the devices heretofore used, the space between the locked stringers is completely or practically completely closed, so that when the fasteners are used on underwear or the like, the metallic parts of the fastener members will not come into contact with the body, and there will be no spaces through which air, mud or other materials might pass. Such a fastener can be used for instance in underwear without causing any discomfort, because the inner faces of the projecting parts of the fastener members in locked state are always covered by the contacting edges of the stringers. It can also with advantage be used in hand bags and similar portable containers, because the metallic fastener members projecting beyond and lying above the plane of the stringers form a strap-like body, which is a good substitute for the metal handles otherwise used in connection with hand bags and the like. The novel fastener is also very pliable and forms a reliable closure, which can not be opened neither by pulling in the plane of the stringers nor by bending it in a direction perpendicular to the plane of the stringers.

According to the invention the above named advantages are achieved by giving the fastener members such a bent form, that the locking parts of the same do not project beyond the preferably beaded stringer edge to which the fastener members are attached, but are located at the side of the bead or seam of the stringer edge and particularly laterally behind this bead or seam in such a manner, that the beads or seams of the stringers in closed position are bent off from the plane of the latter, so that the series of fastener members is lying in a plane parallel to that of the stringer. At the same time the interlocking parts of the fastener members may be so dimensioned relative to the clamping parts of the same, by means of which the members are fixed to the stringers, that in locked position the opposing faces of the clamping parts are lying tightly adjacent each other and are only separated from each other by the double thickness of the stringer. In closed position the bent-off opposing edges of the stringers carrying the series of fastener members will therefore contact with each other and cover the inner surfaces of the interlocking parts of the fastener members, whereas, at the same time, the fastener members on the outer side form a strap-like metallic body.

The form of the interlocking parts proper of the fastener members is per se of no importance. The same may for instance consist of projections and grooves or of hooks on one side of the closure which are adapted to cooperate with eyelets on the other side. When the locking parts consist of projections on the members on one of the stringers and corresponding grooves in the locking parts of the members on the other stringer it is however of importance that the fastener members arranged in series on one of the stringers, for instance the left one, form mirror images of the fastener members carried by the other stringer, in order that each projection can be brought into position opposite the appertaining groove when the fastener is closed by means of the slider.

When the fastener members are formed in the manner described an increased security is obtained, since it is possible to give the interlocking surfaces a much greater length than the known fasteners in which the individual members have locking parts lying in front of the beaded edges of the stringers.

The form of the slider is also of importance for the novel fastener arrangement. This does not like the known fastener sliders consist of a front wall and a back wall surrounding the fastener members on both sides, but does only comprise a front wall, since the rear side of the series of fastener members is covered by the edges of the stringers. The side walls of the slider are at their free ends inwardly bent so as to form narrow flanges running substantially parallel to the front wall. These flanges are adapted to catch behind the parts of the fastener members projecting from the plane of the stringers. The pulling tape or ring of the fastener can be arranged on the front or the rear side of the slider, depending upon the manner in which the fastener is to be carried and the purpose for which it is designed.

Some preferred constructional forms of the invention are illustrated by way of examples in the accompanying drawing.

Fig. 1 is a face view showing a partially closed fastener with the opposing stringer edges contacting with each other.

Fig. 2 shows a slider seen from the rear side.

Fig. 2ª is a section taken along the line 2ª—2ª in Fig. 2.

Fig. 2ᵇ is a section taken on the line 2ᵇ—2ᵇ in Fig. 2.

Fig. 3 is a plan view, partially in section, of a preferred form of fastener members. Fig. 3 also shows, how these fastener members may be clamped to the beaded edge of a stringer.

Fig. 4 is a plan view partially in section showing the position of the fastener members and the stringers when the fastener is in unlocked position.

Fig. 5 is a plan view partially in section showing the position of the fastener members in closed position.

Fig. 6 is a front view partially in section of the device shown in Fig. 5.

Fig. 7 is a perspective showing two cooperating fastener members having interlocking parts in the form of hooks and eyelets.

Fig. 8 is a front view partially in section showing still another modification of the fastener members.

According to Figs. 1 and 3 to 6 the fastener members l, l', which are clamped to the beaded edges 2 and 3 respectively of the stringers 4, 5, consist of clamping jaws 6, 6' which are adapted to be clamped to the beaded stringer edges 2 and 3 respectively, and of shanks 7 having interlocking elements. The latter do not as in the fasteners of known construction project beyond the front edge of the beads 2 and 3, but are arranged laterally to and particularly laterally behind the clamping jaws 6, 6', so that the projections or cams 8 as well as the corresponding grooves 9 will lie substantially parallel to the sides of the stringers 4 and 5, before the edges of the latter are bent (Fig. 3). In operative state the fastener members l, l' take the position relative to the stringers 4 and 5 shown in Fig. 4, when the fastener is open, and the position shown in Fig. 5, when the fastener is closed. In operative or finished state the beaded edges 2 and 3 carrying the fastener members are bent twice about 90°, so that they form an angle of 180° with the plane of the stringers 4 and 5. The fastener members l, l' are therefore on one side in their entirety located outside of the plane of the stringers 4 and 5, and will therefore act as a metal strap fixed to the said stringers, whilst on the inner side (see Fig. 5) the right-angularly bent beaded edge of the stringer 4 will contact with the right-angularly bent edge of the stringer 5, so that the inner faces of the fastener elements in locked position are completely covered by fabric, leather or the like. In order to obtain a tight closure the clamping jaws 6, must be so dimensioned relative to the locking shanks 7, that the fronts of the former, when the fastener is locked, are separated from each other by a double layer of stringer material.

Instead of the fastener members described above, which are equipped with cooperating projections 8 and grooves 9, fastener members with locking elements of a different form may be used. Figs. 7 and 8 show for instance fastener members the parts 7 of which on one side are formed with hooks 10 and on the opposite side with eyelet-shaped grooves 11, which latter are laterally displaced relative to the hooks. The form of the cooperating locking elements is altogether of little or no importance. The only matter of importance is the position of the parts 7 relative to the clamping jaws 6 and therewith the particular position of the fastener members l relative to the stringers 4 and 5.

The Figs. 4, 5, 6, 7 and 8 show the right and left hand fastener members with cooperating projections and grooves.

Figs. 2, 2ª and 2ᵇ show in detail a slider suitable for use in connection with the novel fastener members. The slider has a front wall 12. A rear wall is not provided, because the fastener members, as already mentioned, on the rear side are not exposed, but are covered by the material of the stringers. The lateral edges of the front wall 12 have the form of U-shaped guide channels 13, 14, which embrace the parts of the fastener members projecting from the plane of the stringers. The short flanges 13' and 14' of the guide channels catch behind the edges of the fastener members and prevent the slider from being detached from the rows of fastener elements.

The operative part 15 of the slider is equipped with a plate-shaped member 16 which is formed with a slot 16' in which the handle or strap is fixed by means of which the slider is moved. The slider cam 15 is formed with laterally and downwardly projecting ribs 15' which are adapted to catch behind the parts of the fastener members carrying the locking projections (see Fig. 5), so that the said members, when the slider is moved, are always guided in a single common plane and are not dislocated above or below one another.

The stringers 4 and 5, to the beads or edges 2 and 3 of which the fastener elements are clamped, can on the parts of the same which contact when the fastener is closed be equipped with additional beads 4', 5' (see Fig. 3) or be otherwise thickened, in order to form a still tighter closure.

I claim:—

1. In a separable fastener, in combination, a pair of stringers, a series of fastener members fixed to one edge of each stringer, each fastener member comprising clamping legs and a shank with locking elements, and slidable means for interlocking and releasing the fastener members, said slidable means comprising a slider having U-shaped guide channels with flanges to catch behind the clamping legs and having a cam with laterally projecting ribs, adapted to catch behind the shanks of the fastener members carrying the locking elements and thereby prevent undesired dislocations of said members when the slider is moved, the shank of each fastener member having the locking elements constituting an extension of one of the clamping legs and each stringer having a beaded edge and the clamping legs of each fastener member embracing the bead and being rounded off and being of a thickness such that the shank of the fastener member which carries the locking elements is thereby held at the desired distance from the stringer to permit the slide to operate.

2. In a separable fastener, a pair of stringers comprising flat strips having beaded edges, a series of fastener members fixed to one edge of each stringer, each fastener member having a clamping member of uniform cross-section throughout and encircling the beaded edge of the stringer to which it is attached, each fastener member also having a shank with locking elements and slidable means for interlocking and releasing the fastening members, said flat strips being carried around the ends of the clamping members through an arc of 180° to extend in a plane parallel to the shanks having the locking elements and offset therefrom, said slidable means comprising a front plate, of Y-shape in plan view, and sides whose edges are bent inwardly to form U-shaped guides, and a cam member between the divergent portions of the Y, said guides being shaped to embrace said fastener members around the clamping members thereof to draw together the beads of said stringers which lie in a plane offset from the plane containing those portions of said flat strips which were carried around the ends of said clamping members.

3. In a separable fastener, supporting stringers each comprising a flat tape having a bead along one edge, a set of fastener members, each fastener member comprising a clamping member and locking shank, said clamping member being of a uniform cross-section and being bent into the form of an I and encircling said bead from one face of the tape to the opposite face thereof, the tape being carried around the end of said clamping member 180° so as to lie in a plane offset from that containing the locking shank and so as to extend in a direction opposite to that in which said locking shank extends, the locking shanks being located in front of the beads and being of such length that when interlocked the tapes will lie in close proximity in virtue of which there will be little or no space between the tapes of adjacent stringers.

4. In a separable fastener, supporting stringers each comprising a flat tape having a bead along one edge, a set of fastener members, each fastener member comprising a clamping member and locking shank, said clamping member being of a uniform cross-section and being bent into the form of an I and encircling said bead from one face of the tape to the opposite face thereof, the tape being carried around the end of said clamping member 180° so as to lie in a plane offset from that containing the locking shank and so as to extend in a direction opposite to that in which said locking shank extends, and a slidable member for interlocking and releasing the fastening members, said slidable member including a front plate of Y-shape in plan view and side flanges in planes at right angles to said front plate, the edges of said flanges being bent inwardly to provide U-shaped guides to embrace said fastener members' clamping shanks to draw together the beaded edges of said stringers, the furcations of the Y embracing between them a cam member for separating the edges of said stringers.

SIGISMUND STILLSCHWEIG.